No. 671,675. Patented Apr. 9, 1901.
W. L. JUDSON.
POWER TRANSMITTING DEVICE.
(Application filed Apr. 20, 1900.)
(No Model.) 5 Sheets—Sheet 2.
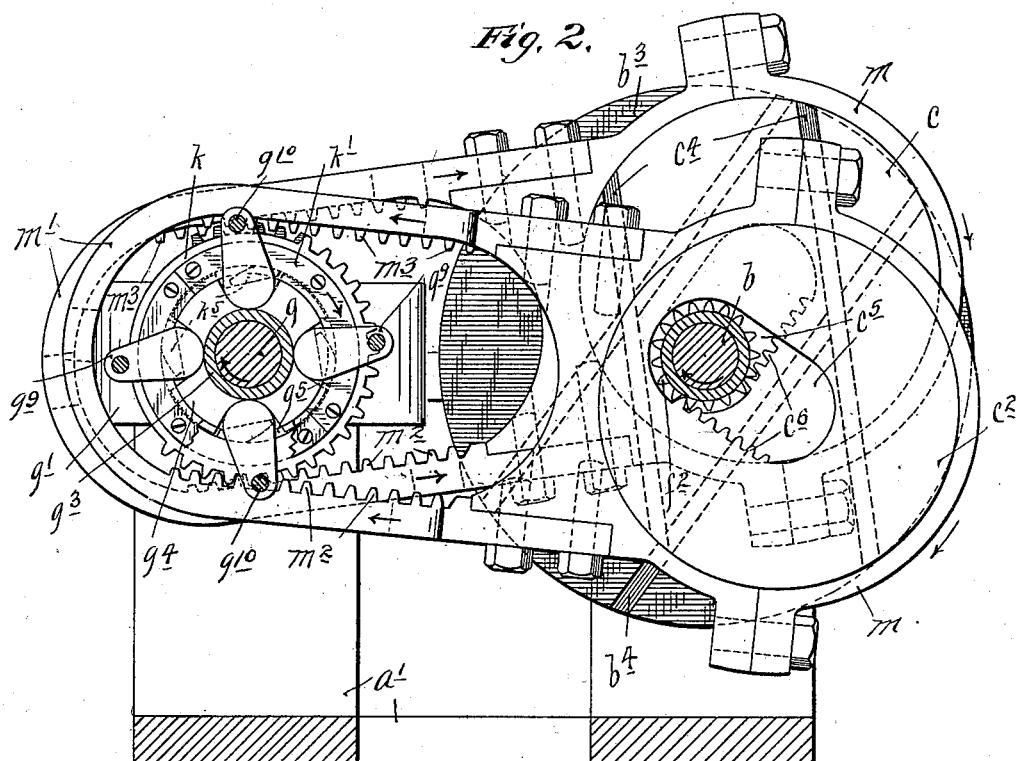
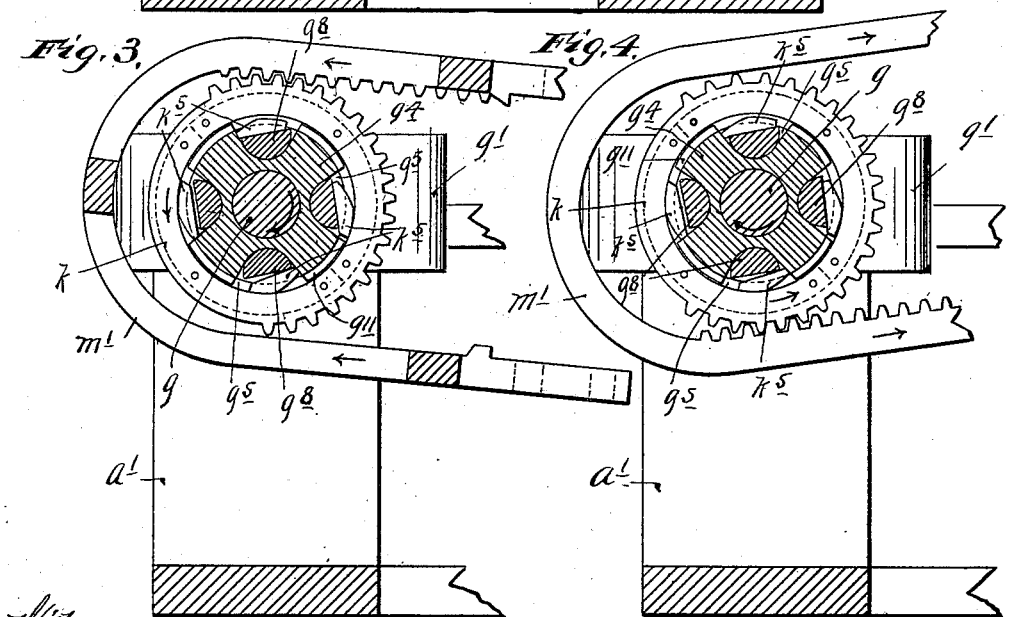
Witnesses.
Harry Kilgore
Robert Otto
Inventor.
Whitcomb L. Judson
By his Attorneys,
Williamson & Merchant No. 671,675. Patented Apr. 9, 1901.
W. L. JUDSON.
POWER TRANSMITTING DEVICE.
(Application filed Apr. 20, 1900.)

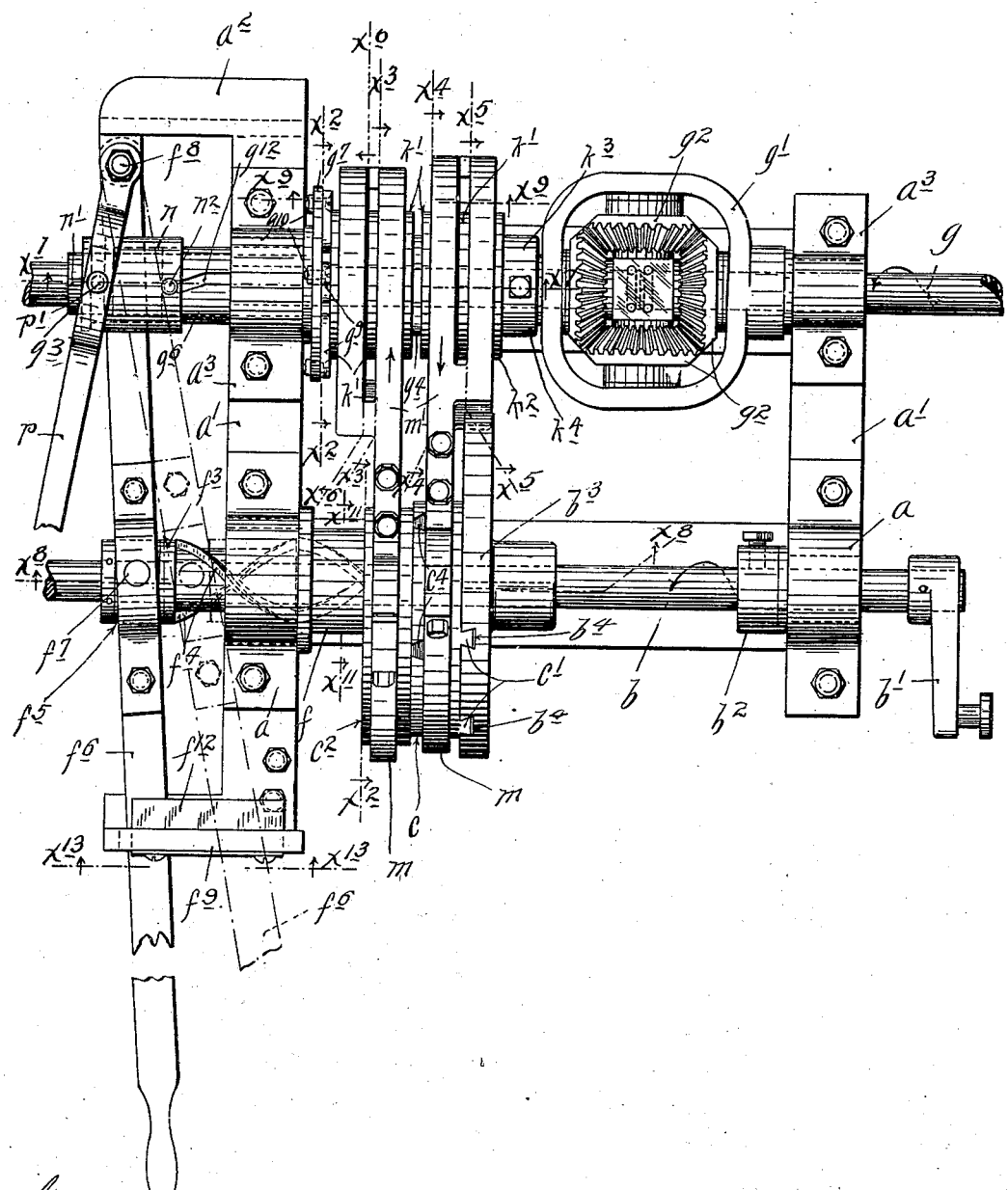

(No Model.) 5 Sheets—Sheet 3.

Witnesses,
Harry Kilgore
Robert Otto.

Inventor,
Whitcomb L. Judson,
By his Attorneys,
Williamson & Merchant

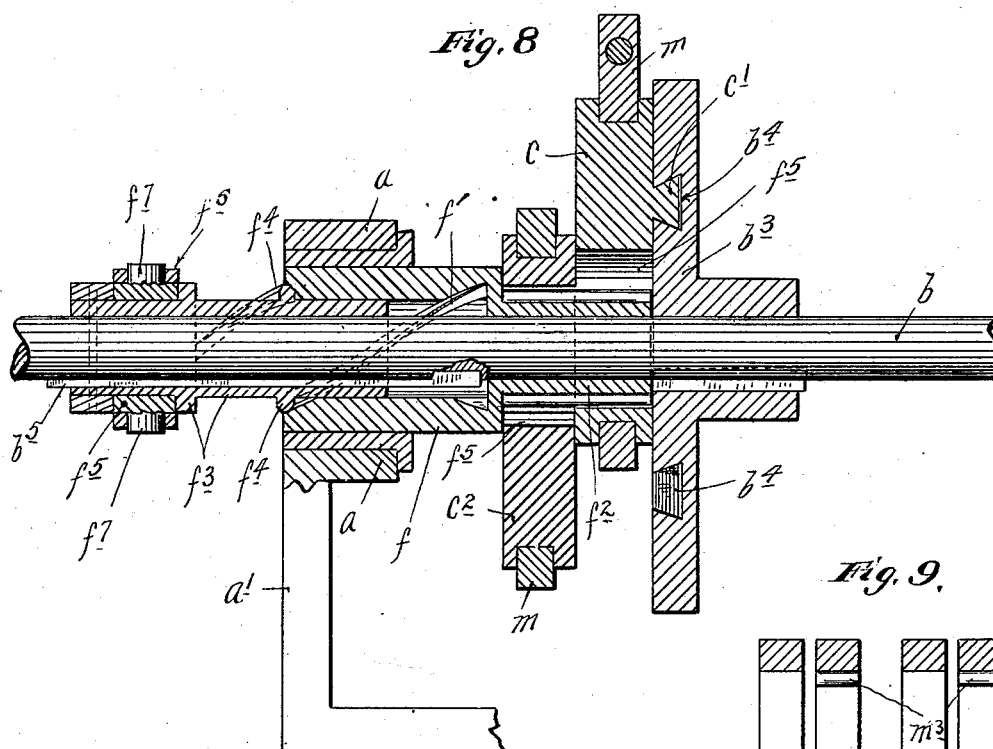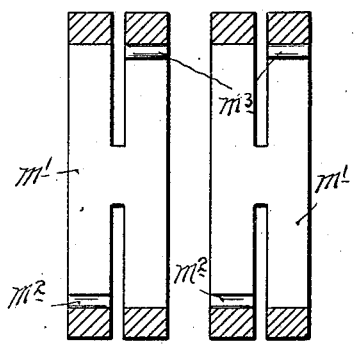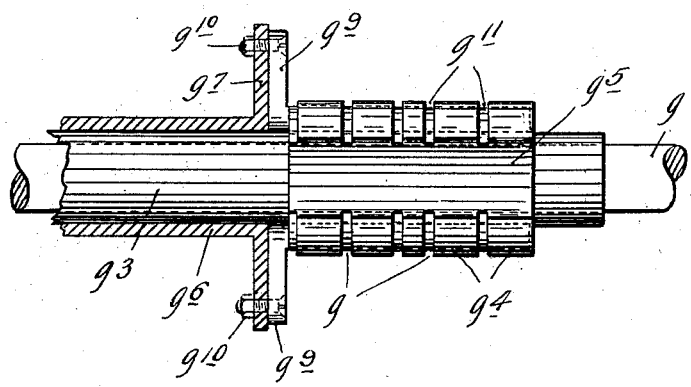

No. 671,675. Patented Apr. 9, 1901.
W. L. JUDSON.
POWER TRANSMITTING DEVICE.
(Application filed Apr. 20, 1900.)
(No Model.) 5 Sheets—Sheet 5.
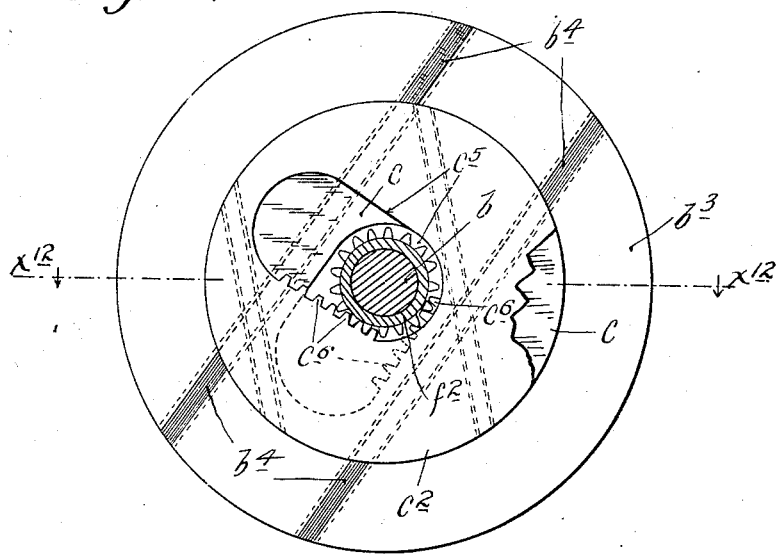
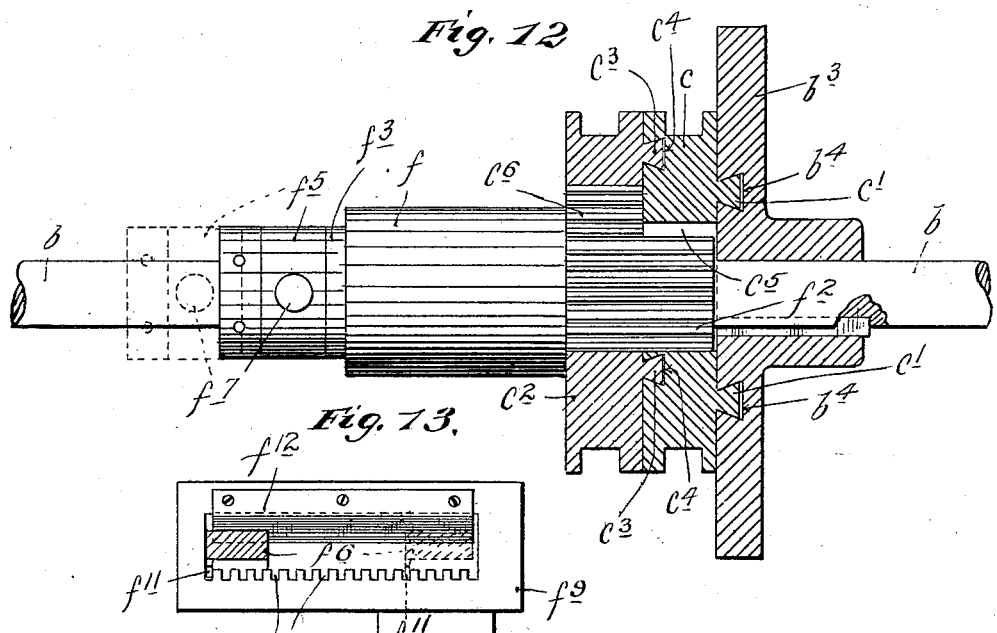
Witnesses
Harry Kilgore,
Robert Otto
Inventor,
Whitcomb L. Judson.
By his Attorneys,
Williamson & Merchant

UNITED STATES PATENT OFFICE.

WHITCOMB L. JUDSON, OF CHICAGO, ILLINOIS.

POWER-TRANSMITTING DEVICE.

SPECIFICATION forming part of Letters Patent No. 671,675, dated April 9, 1901.

Application filed April 20, 1900. Serial No. 13,593. (No model.)

*To all whom it may concern:*

Be it known that I, WHITCOMB L. JUDSON, a citizen of the United States, residing at Chicago, in the county of Cook and State of Illinois, have invented certain new and useful Improvements in Power-Transmitting Devices; and I do hereby declare the following to be a full, clear, and exact description of the invention, such as will enable others skilled in the art to which it appertains to make and use the same.

My invention relates generally to power-transmitting mechanism, but has for its especial object to provide an improved variable-speed and reversible power-transmitting device for automobiles.

To the above ends the invention consists of the novel devices and combinations of devices hereinafter described, and defined in the claims.

A power-transmitting device of this character to fully meet the requirements of automobile service must be controllable at will to transmit from a constantly-running driving shaft or member a variable speed with an inversely-proportional power and must be capable of a quick and easy reversal and of manipulation to stop the vehicle without reversing the direction or stopping the movement of the driving shaft or member. When the driving shaft or member is driven from an air, steam, or gas engine, in which case the shock from a sudden reversal of the transmitting mechanism may be taken up by the elastic fluid within such motor, the requirements of efficient service are best met by the provision of a transmitting device which is capable of instant change of direction or reversal without coming to a stop.

All the features above noted as desirable are embodied in my present invention, which is illustrated in the accompanying drawings, wherein like notations indicate like parts throughout the several views.

Figure 5:
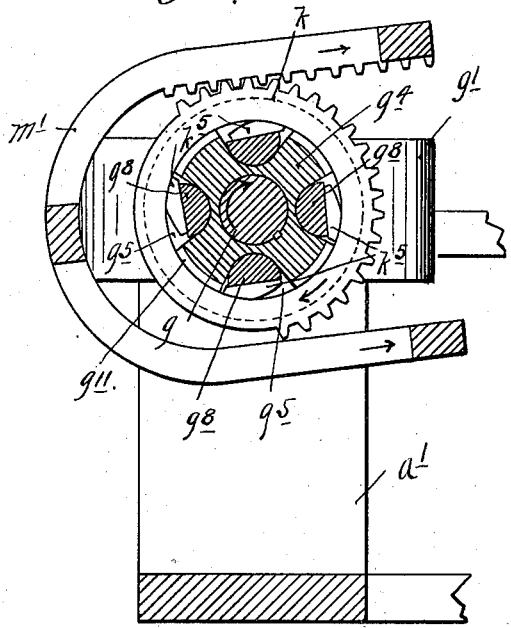
Figure 6:
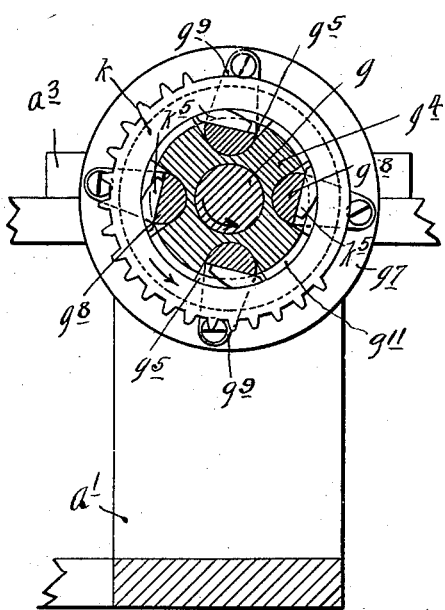
Figure 7:
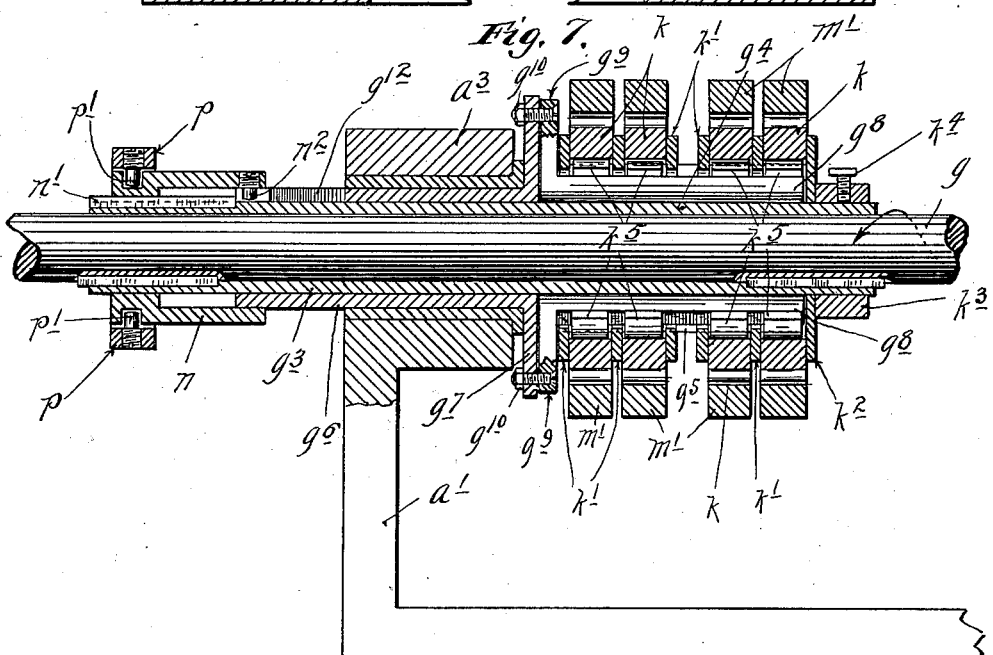

Figure 1 is a plan view, with some parts broken away, illustrating my improved power-transmitting mechanism. Fig. 2 is a transverse vertical section on the line $x^2 x^2$ of Fig. 1. Fig. 3 is a detail in vertical section on the line $x^3 x^3$ of Fig. 1. Fig. 4 is a transverse vertical section on the line $x^4 x^4$ of Fig. 1. Fig. 5 is a transverse vertical section on the line $x^5 x^5$ of Fig. 1. Fig. 6 is a vertical section on the line $x^6 x^6$ of Fig. 1, some parts being removed. Fig. 7 is a vertical section on the line $x^7 x^7$ of Fig. 1, some parts being shown in full. Fig. 8 is a vertical section approximately on the line $x^8 x^8$ of Fig. 1, some parts being shown in full. Fig. 9 is a transverse section through the rack-yokes on the line $x^9 x^9$ of Fig. 1. Fig. 10 is a detail view, partly in plan and partly in horizontal section, showing the clutch hub or sleeve and immediately-connected parts. Fig. 11 is a vertical section approximately on the line $x^{11} x^{11}$ of Fig. 1, with some parts broken away and others removed and with the eccentrics shown as adjusted to concentricity with each other and with the axis of the driving-shaft. Fig. 12 is a horizontal section on the line $x^{12} x^{12}$ of Fig. 11, some parts being shown in full; and Fig. 13 is a detail view in vertical section on the line $x^{13} x^{13}$ of Fig. 1.

In suitable bearings $a$ of a framework $a'$ is journaled a so-called "constantly-running" driving-shaft or rotary driver $b$, which receives its rotary motion in a continuous direction from any suitable source and through any suitable connections therewith, which connections in the illustration given include a crank-shaft $b'$ on said shaft $b$. By a suitable collar or stop $b^2$ and other devices, hereinafter noted, the driving-shaft $b$ is held against endwise movement.

The driving-shaft $b$ carries a face-plate or head $b^3$, shown as provided in its face with parallel dovetailed grooves $b^4$. One member $c$ of a pair of eccentrics is provided with dovetailed guides $c'$, that work in the dovetailed grooves $b^4$ of the face-plate $b^3$, and the other member $c^2$ of said eccentrics is provided with dovetailed guides $c^3$, that work in dovetailed grooves $c^4$ of the said eccentrics $c$. Both eccentrics $c$ and $c^2$ have elongated slots $c^5$, provided with short racks $c^6$. A sleeve $f$, in which the driving-shaft $b$ is mounted to run, is in turn mounted in the left-hand bearing $a$. This sleeve $f$ is provided with a wide-faced pinion $f^2$, that projects through the slots $c^5$ of both eccentrics and meshes with both of the rack-sections $c^6$ thereof.

The relation of the guide-slots $b^4$ and $c^4$ and the racks $c^6$ to each other and to the pinion $f^2$ should be here noted. The rack $c^6$ of the eccentric $c$ extends parallel to the guide-slots $b^4$ and the eccentric-guides $c'$, while the two racks $c^6$, as shown, extend at right angles to each other, although they might otherwise extend. The guide-slots $c^4$ extend transversely of the guide-slots $b^4$, and it is incident to the relation of the racks $c^6$ to each other that they extend at equal angles to both of the said racks and to the said guide-channels $b^4$. With the guide-channels arranged as indicated the proper rotary movements of the pinion $f^2$ will impart equal radial movements to the eccentrics $c$ and $c^2$ between the extreme limits indicated in Figs. 2 and 11. In the position shown in Fig. 11 the eccentrics are moved to concentricity with each other and with the axis of the driving-shaft $b$, and hence will impart no motions whatever to the parts which when otherwise adjusted they drive, while in the position shown in Fig. 2 the maximum motion possible with the length of slots shown will be given to the driven parts.

The rotations of the pinion $f^2$ necessary to impart the adjustments above indicated to the eccentrics are given by a slidable sleeve $f^3$, secured for rotation with the shaft $b$ by a key $b^5$ and provided with one or more spiral cam flanges or threads $f^4$, that engage correspondingly-formed internal grooves $f'$ in the sleeve $f$. The sleeve $f^3$ has a loose ring $f^5$, to which the intermediate portion of a shipper-lever $f^6$ is pivotally secured at $f^7$. The shipper-lever $f^6$ is pivoted to a bracket $a^2$ of the main frame $a'$, as shown, by means of a nutted bolt $f^8$, and at its outer end it works through the slot of a latch-plate $f^9$, secured on the frame $a'$ and provided with a series of notches $f^{10}$. Said lever $f^6$ is provided with a depending detent or lip $f^{11}$. The lever $f^6$ is subject to a spring-plate $f^{12}$, which serves to hold the detent or lip $f^{11}$ locked in the engaged notch $f^{10}$ and said lever $f^6$ in any position in which it may be set.

The driven member is in the form of a shaft $g$, mounted in suitable bearings $a^3$ of the main frame $a'$. As shown, this shaft $g$ is formed in sections that are connected by a compensating gearing of ordinary or any suitable construction, but, as shown, comprising a yoke $g'$ and miter-gears $g^2$. A long sleeve $g^3$ is keyed to the driven shaft $g$, the same being mounted in the left-hand bearing $a^3$ and provided with a hub portion $g^4$, having a plurality of (as shown, four) longitudinal peripheral grooves or rocker-seats $g^5$.

Loosely mounted on the reduced portion of the sleeve $g^3$ is the sleeve-like hub $g^6$ of a reversing-disk $g^7$. Mounted to oscillate within each seat $g^5$ of the hub $g^4$ is a semicylindrical reversing-rocker $g^8$, which is provided at its left-hand end with an arm $g^9$, the outer end of which is pivoted to the reversing-disk $g^7$, as shown, by means of a short nutted bolt $g^{10}$. The purpose of these so-called "reversing-rockers" will be stated a little later on.

Loosely mounted on the hub $g^4$ are four annular gears $k$, which in the construction illustrated are provided with teeth for but little more than a semicircumference. The gears $k$ are properly spaced by annular keepers $k'$, that work in grooves $g^{11}$ of the hub $g^4$, and are formed in sections to adapt them to be placed in working positions and secured to the respective gears $k$ by screws or other suitable devices. Outward of the right-hand member of the gears $k$ is a retaining-washer $k^2$, which is held in place by a collar $k^3$, provided with a set-screw $k^4$, by which in turn it is secured to the right-hand end of the sleeve $g^3$. The annular keepers $k$ and washer $k^2$ form the sides, and the flattened outer surfaces of the rockers $g^8$ and internal surfaces of the gears $k$ form the inner and outer walls of a plurality of pockets or cages, (as shown, four for each gear,) in each of which is a double-faced and reversely-acting loose wedge or dog $k^5$. The gears $k$ are driven from the eccentric $c$ $c^2$ by eccentric-straps $m$ of ordinary or any suitable construction, but each of which is provided with a yoke-rack $m'$, that is preferably bifurcated, one section thereof being provided with rack-teeth $m^3$ on its upper prong. In this way four racks are provided, one engaging with each of the four annular gears $k$.

When the reversing-disk $g^7$ stands in the relative position to the sleeve $g^3$ and shaft $g$ indicated in Figs. 2 and 6, the rockers $g^8$ will stand in the positions indicated in said two figures and in Fig. 5 and the shaft $g$ will be driven in the direction indicated by the arrows marked on said views. The actions of the rockers and driving-wedges are reversed by slightly rotating the disk $g^7$ and its sleeve $g^6$ with respect to the said shaft, and this is accomplished as follows: A slidable collar $n$, which is caused to rotate with the sleeve $g^3$ and shaft $g$ by means of a key $n'$, telescopes over the end of the sleeve $g^6$ and is provided with an inwardly-projecting stud or cam-pin $n^2$, that works in a cam-groove $g^{12}$ in the said sleeve $g^6$. The collar $n$ is shifted longitudinally by a shipper-lever $p$, which, as shown, is pivoted on the same bolt $f^8$ which serves as a pivot for the shipper-lever $f^6$, heretofore noted. This lever $p$ is provided with studs or pins $p'$, that work in a suitable channel formed in the said collar $n$. When the shipper-lever $p$ is moved toward the right, the disk $g^7$ will be slightly rotated with respect to the sleeve $g^3$ and shaft $g$, with both of which, of course, it rotates in the relative position in which it is set. When the said disk $g^7$ is thus shifted, the rockers $g^8$ and wedges or dogs $k^5$ assume such relations that under the continued movement of the eccentrics and the constantly-running driving-shaft movement in a reverse direction will be imparted to the driven shaft $g$.

The direction of movement of the driven shaft $g$ is determined by the positions in which the clutch devices are set, and with these clutch devices set in a given position the said shaft will be driven in a predetermined direction regardless of the direction in which the driving-shaft $b$ is rotated. Under the outstroke or movement toward the left with respect to Figs. 2, 3, 4, and 5 the upper racks $m^3$ move their corresponding gears $k$ in one direction and the lower racks $m^2$ drive their respective gears in a reverse direction, and under the return movements of the rack-yokes the direction of rotation of the said gears is in the same order, but in a reverse direction. However, with the reversing disk and rockers set as indicated in the drawings the gears become active as drivers only when moved in the direction indicated in Figs. 5 and 6. Attention is here called to the fact that Figs. 5 and 6 indicate the same direction of rotation, the sections being viewed looking in opposite directions. When thus rotated, the driving wedges or dogs $k^3$ are wedged between the inner surfaces of said gears and the flattened surfaces of the reversing-rockers, so that the hub $g^4$ is connected to the said gear and the driven shaft $g$ is rotated. Under reverse rotations of the gears the dogs $k^5$ will be loosened, so that the gears will turn freely, as shown in Figs. 3 and 4.

Under the movements incident to the eccentric actions the several gears will at different points of the driving-shaft's rotation be moved at different speeds; but each gear is given its maximum and minimum speed of rotation at a different instant of time. The gear which is moving in the proper direction and at the highest rate of speed is the one which at a particular instant is doing the work—that is, each ring in turn takes up the load and leaves the slower-moving ring or gear behind. Thus by the resultant action of the two eccentrics operating through the racks and gears and clutch mechanism the driven shaft $g$ is given a constant or even movement, which of course is variable at will by adjusting the eccentrics in the manner already clearly described.

It will of course be understood that my invention above described is capable of a large range of modification. For instance, a wide-faced pinion $f^2$ is shown as extended for engagement with both of the eccentric-racks $c^6$, whereas separated gears might be secured for common rotations. The one construction is the equivalent of the other. Again, other forms of driving-dogs might be substituted for the double-acting wedges $k^3$—such as balls, for instance; but this substitution, while within the scope of my invention, would not be the full equivalent of the said wedges $k^3$; also, the form of the guide for mounting the eccentrics one upon the other and the one upon the face-plate or driver might take various forms. The expression "eccentrics" is used in a broad sense and would include what are ordinarily designated as "cranks." Various other alterations may also be made, both as to details of construction and as to the selection of devices for controlling the movements of the mechanism.

What I claim, and desire to secure by Letters Patent of the United States, is as follows:

1. In a power-transmitting mechanism the combination with a rotary driver, of a pair of eccentrics driven thereby, one eccentric mounted upon the face of the other, which eccentrics are adjustable to and from concentricity with each other and with the axis of said driver.

2. In a power-transmitting mechanism the combination with a rotary disk-like driver, of a pair of eccentrics mounted side by side for movement one upon the other, and one thereof being carried by and mounted for movement on the face of said driver, substantially as described.

3. In a power-transmitting mechanism the combination with a rotary, disk-like driver, of a pair of eccentrics mounted for straight-line adjustment, one upon the other, and one thereof being mounted for straight-line adjustments on the face of the said driver, both of said eccentrics being movable to and from concentricity with the axis of said driver.

4. In a power-transmitting mechanism the combination with a rotary driver, of a pair of eccentrics carried thereby, mounted for straight-line movements toward and from the axis of said driver and provided with internal racks, and a pinion engaging said racks and rotatively movable to adjust said eccentrics, substantially as described.

5. In a power-transmitting mechanism the combination with a rotary driver, of a pair of eccentrics mounted for straight-line movements to and from concentricity with the axis of said driver, said eccentrics having internal racks, a pinion engaging said racks and rotatively adjustable, and a cam-sleeve operating on said pinion, by a sliding movement, to effect the adjustments of said eccentrics, substantially as described.

6. The combination with a rotary driver and driven members, of a pair of eccentrics carried by said driver, racks reciprocated by said eccentrics, gears meshing with said racks, and one-way clutch connections between said gears and said driven member, substantially as described.

7. The combination with a rotary driver and a rotary driven member, of a pair of eccentrics carried by said driver, racks reciprocated by said eccentrics, gears meshing with said racks, and a reversible one-way clutch connection between said gears and said driven member, substantially as described.

8. The combination with a rotary driver, and a rotary driven member, of a pair of eccentrics carried by said driver, racks reciprocated by said eccentrics, gears meshing with said racks, a fluted hub or sleeve carried by said driven member and working through said annular gear, rockers working within the grooves of said hub, and loose driving dogs or wedges working between said rockers and said annular gears, substantially as described.

9. The combination with the fluted hub $g^4$ of the reversing-rockers $g^8$ $g^9$ carried by said hub, the reversing-head $g^7$ pivoted to the arms $g^9$ of said rockers, the slidable collar $n$ having a cam action on the hub of said reversing-head $g^7$, the plurality of annular gears $k$ loosely mounted on said hub $g^4$, the plurality of double wedges $k^5$ working between said rocker $g^8$ and said gears $k$, and reciprocating racks meshing with said gears and operating the same, substantially as described.

10. The combination with an eccentric, and a member receiving rotary movement therefrom, of a pair of gears loosely mounted on said driven member, clutch devices connecting said gears and said driven member, and a pair of racks driven by said eccentric and operating on said pair of gears, to move the same in a reverse direction under given movements of the said racks, substantially as described.

11. The combination with a pair of eccentrics and a member driven therefrom, of two pairs of gears mounted on said driven member, clutch devices connecting said gears and said driven member, eccentric-straps on each eccentric, and the yoke extensions from said eccentric-straps having the reversely-acting racks engaging one with each of said gears, and operating thereon, substantially as described.

In testimony whereof I affix my signature in presence of two witnesses.

WHITCOMB L. JUDSON.

Witnesses:
JAMES G. BARSALOUX,
J. W. WATSON.